(12) United States Patent
Phillis et al.

(10) Patent No.: US 9,272,572 B2
(45) Date of Patent: Mar. 1, 2016

(54) DUAL LOCK RING WHEEL ASSEMBLY

(71) Applicant: Goodrich Corporation, Charlotte, NC (US)

(72) Inventors: Robert Lee Phillis, Covington, OH (US); Rick Brown, Dayton, OH (US); Scottie Whittle, Springboro, OH (US); Andrew Slanker, Fairborn, OH (US)

(73) Assignee: Goodrich Corporation, Charlotte, NC (US)

( * ) Notice: Subject to any disclaimer, the term of this patent is extended or adjusted under 35 U.S.C. 154(b) by 334 days.

(21) Appl. No.: 13/731,366

(22) Filed: Dec. 31, 2012

(65) Prior Publication Data

US 2014/0182759 A1  Jul. 3, 2014

(51) Int. Cl.
| | |
|---|---|
| *B60B 25/04* | (2006.01) |
| *B60B 25/12* | (2006.01) |
| *B60B 25/14* | (2006.01) |
| *B60B 25/22* | (2006.01) |
| B60B 25/08 | (2006.01) |
| B60B 3/00 | (2006.01) |
| B60B 31/00 | (2006.01) |

(52) U.S. Cl.
CPC ............. *B60B 25/04* (2013.01); *B60B 25/12* (2013.01); *B60B 25/14* (2013.01); *B60B 25/22* (2013.01); *B60B 3/00* (2013.01); *B60B 25/08* (2013.01); *B60B 31/00* (2013.01); *B60Y 2200/51* (2013.01); *Y10T 29/49494* (2015.01)

(58) Field of Classification Search
CPC ........ B60B 25/04; B60B 25/08; B60B 25/10; B60B 25/12; B60B 25/14; B60B 25/18; B60B 25/22; Y10T 29/49528

USPC .............. 301/11.1, 23, 35.3, 35.51; 152/396, 152/398, 401, 406, 409, 410, 411, DIG. 10; 244/103 R; 29/894.352

See application file for complete search history.

(56) References Cited

U.S. PATENT DOCUMENTS

| | | | | | |
|---|---|---|---|---|---|
| 2,798,529 | A | * | 7/1957 | Herzegh ........................ | 152/427 |
| 2,827,100 | A | * | 3/1958 | Herzegh ........................ | 152/410 |
| 3,043,358 | A | * | 7/1962 | Scott ............................. | 152/410 |
| 3,118,485 | A | * | 1/1964 | Le Jeune ...................... | 152/410 |
| 3,463,213 | A | * | 8/1969 | Wade ............................ | 152/409 |
| 3,623,530 | A | * | 11/1971 | Beyers et al. ................. | 152/410 |
| 4,209,052 | A | * | 6/1980 | French ......................... | 152/410 |
| 4,530,387 | A | * | 7/1985 | Osawa .......................... | 152/410 |
| 4,574,859 | A | * | 3/1986 | Smith ........................... | 152/410 |
| 4,721,142 | A | | 1/1988 | Foster | |
| 4,911,216 | A | * | 3/1990 | Yamoto et al. ................ | 152/410 |
| 5,086,821 | A | | 2/1992 | Russell et al. | |
| 5,259,430 | A | * | 11/1993 | Smith et al. .................. | 152/410 |
| 5,984,421 | A | * | 11/1999 | Proctor ......................... | 301/23 |
| 2003/0140998 | A1 | * | 7/2003 | Oba et al. ..................... | 152/410 |
| 2010/0164275 | A1 | * | 7/2010 | Oba et al. ..................... | 301/9.1 |
| 2012/0313423 | A1 | | 12/2012 | Brown et al. | |

* cited by examiner

*Primary Examiner* — Kip T Kotter
(74) *Attorney, Agent, or Firm* — Kinney & Lange, P.A.

(57) ABSTRACT

A wheel assembly includes a wheel base and a side rim disposed about the wheel base. A recess is formed on an inside surface of the side rim. A cavity is disposed between the wheel base and the side rim. An air seal is disposed between the wheel base and the side rim. A locking mechanism secures the side rim in position around the wheel base. The locking mechanism is configured to prevent the air seal from disengaging with the inside surface and allowing air to exit the wheel assembly between the wheel base and the side rim when the locking mechanism is properly installed. The locking mechanism is also configured to permit the air seal to disengage the inside surface and allow air to exit the wheel assembly between the wheel base and the side rim when the locking mechanism is not properly installed.

21 Claims, 13 Drawing Sheets

DUAL LOCK RING WHEEL ASSEMBLY

BACKGROUND

Boltless aircraft wheels, also known as lock ring aircraft wheels, often comprise a wheel base, a side rim, and a single lock ring. The wheel base is typically coupled to the aircraft brake for applying torque to cause the aircraft to decelerate. The side rim is typically coupled about a circumference of the wheel base and is often at least partially in contact with a tire. A single lock ring is typically placed in between the wheel base and the side rim for retaining the side rim to the wheel base and transferring torque from the wheel base to the side rim. However, in applications having large brakes (e.g., those with wheel bases nineteen inches in diameter or greater), a wheel having a single lock ring may be prone to a wheel-skid. A wheel-skid is an event in which the tire and side rim continue to roll at ground speed while the wheel base is locked to the brake and not rotating. A wheel-skid is in contrast to a tire-skid, where the tire is stationary, and sliding, relative to the runway.

To reduce the likelihood of a wheel-skid, lock ring wheels may incorporate multiple lock rings. Depending on the geometry of the lock rings, multiple lock rings may have more contact points with the wheel base and the side rim than does a single lock ring. Increasing the number of contact points between the lock rings and the side rim, and between the lock rings and the wheel base, increases the number of pathways in which torque is transferred from the wheel base to the side rim. By increasing the number of torque pathways between the wheel base and the side rim, the possibility that the side rim will slide around the wheel base and produce a wheel-skid is reduced. However, if the multiple lock rings are incorrectly installed between the wheel base and side rim, or if one of the lock rings is not included in the assembly, the number of torque pathways between the wheel base and the side rim may be reduced and the ability of the remaining lock ring(s) to retain the side rim may be adversely affected. Detecting incorrect assembly of the lock rings with the wheel base and side rim may be difficult since the lock rings are confined between and mostly covered by the side rim and wheel base, impairing visual inspection of the lock ring assembly. Detecting incorrect assembly of the lock rings may also be difficult as the wheel may appear visually and operationally functional despite incorrect assembly of the lock rings.

SUMMARY

According to the present invention, a wheel assembly includes a wheel base and a side rim. The side rim is disposed about the wheel base and includes an inside surface and a recess formed on the inside surface. An air seal is disposed between the wheel base and the inside surface of the side rim. A locking mechanism secures the side rim onto the wheel base and prevents the side rim from sliding axially off the wheel base. The locking mechanism is also configured to prevent the air seal from disengaging the inside surface and allowing air to exit the wheel assembly between the wheel base and the side rim when the locking mechanism is properly installed. The locking mechanism is also configured to permit the air seal to disengage the inside surface and allow air to exit the wheel assembly between the wheel base and the side rim when the locking mechanism is not properly installed.

In another embodiment of the present invention, a method for assembling a wheel includes placing a wheel base inside a tire, the wheel base having an air seal seat. A side rim is placed inside the tire around the wheel base. The side rim includes a recess formed on an inside surface of the side rim. The side rim is moved on the wheel base to expose the air seal seat. An air seal is placed around the wheel base and inside the air seal seat. A lock ring assembly is inserted inside a cavity between the wheel base and the side rim, and the tire is inflated. Faulty assembly of the wheel is detected if the air seal disengages the inside surface upon mis-installation of the lock ring assembly such that air exits the wheel between the wheel base and the side rim, thereby preventing inflation of the tire.

In another embodiment of the present invention, a wheel assembly includes a wheel base and a side rim, the side rim being disposed around the wheel base. The side rim includes an inside surface and a recess formed on the inside surface. A cavity disposed between the wheel base and the side rim. An air seal is disposed between the wheel base and the inside surface of the side rim, and disposed axially between the recess and the cavity. A multipart lock ring assembly is disposed within the cavity. The multipart lock ring assembly is configured to prevent the air seal from disengaging the inside surface and allowing air to exit the wheel assembly between the wheel base and the side rim when the multipart lock ring assembly is properly installed. The multipart lock ring assembly is also configured to permit the air seal to disengage the inside surface and allow air to exit the wheel assembly between the wheel base and the side rim when the multipart lock ring assembly is not properly installed.

DETAILED DESCRIPTION

The present invention provides an assembly and method for reducing incorrect assembly of multiple lock rings between the wheel base and the side rim of a wheel assembly. The present invention reduces incorrect assembly of the lock rings by releasing inflation pressure in the wheel assembly when one or more lock rings are missing and by preventing installation of a retaining ring if one or more lock rings are improperly installed between the wheel base and the side rim. Because the wheel assembly is not capable of holding pressurized air when one or more of the lock rings are missing, the wheel assembly cannot be functional until the lock rings are properly installed. The present invention releases pressurized air from the wheel assembly through a recess formed in the side rim, which exposes an air seal between the side rim and wheel base when one or more of the lock rings are missing. Only proper installation of the lock rings will allow inflation of the wheel assembly.

Figure 1:
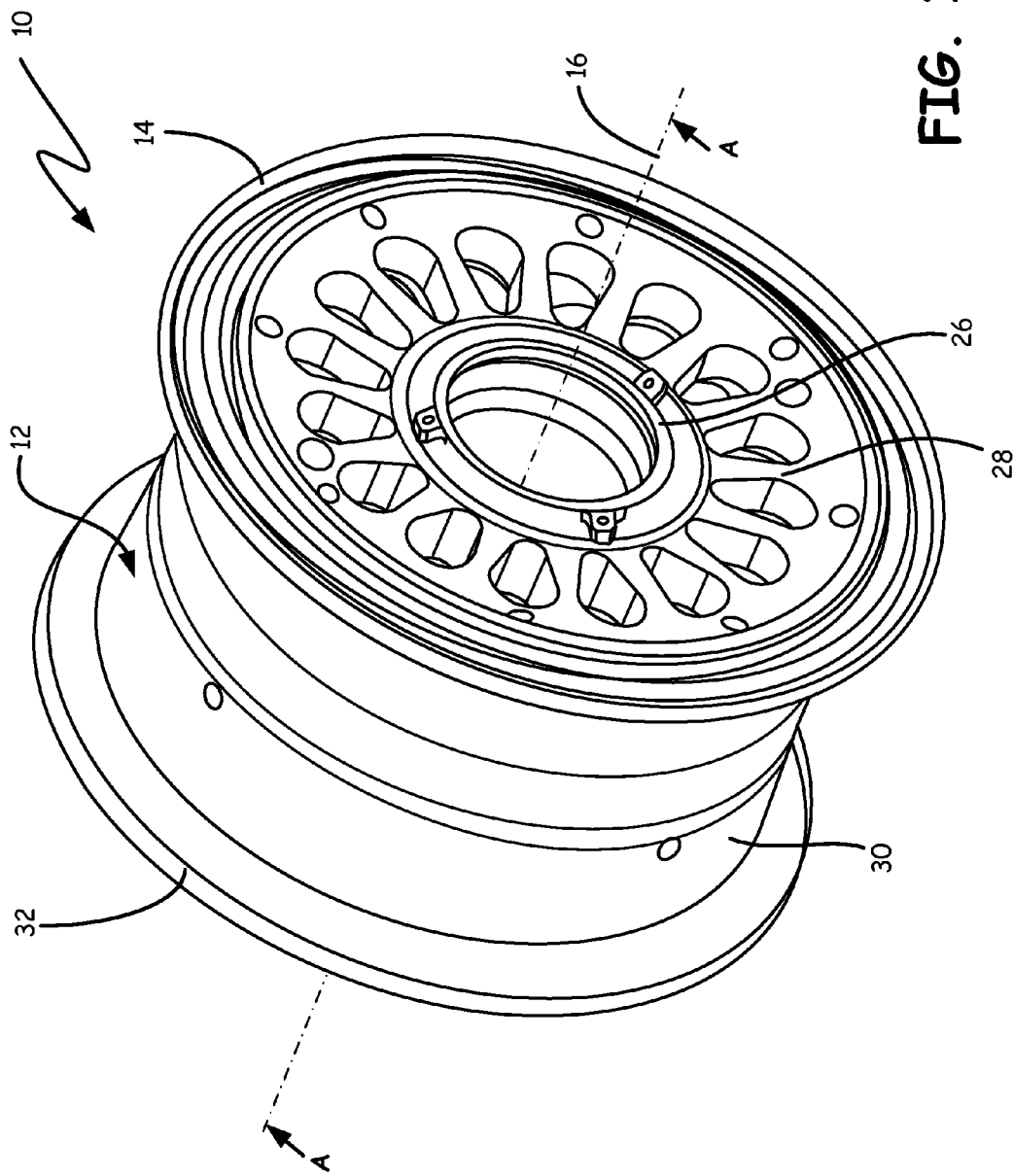
FIG. 1 is a perspective view of a wheel assembly according to the present invention.
Figure 2:
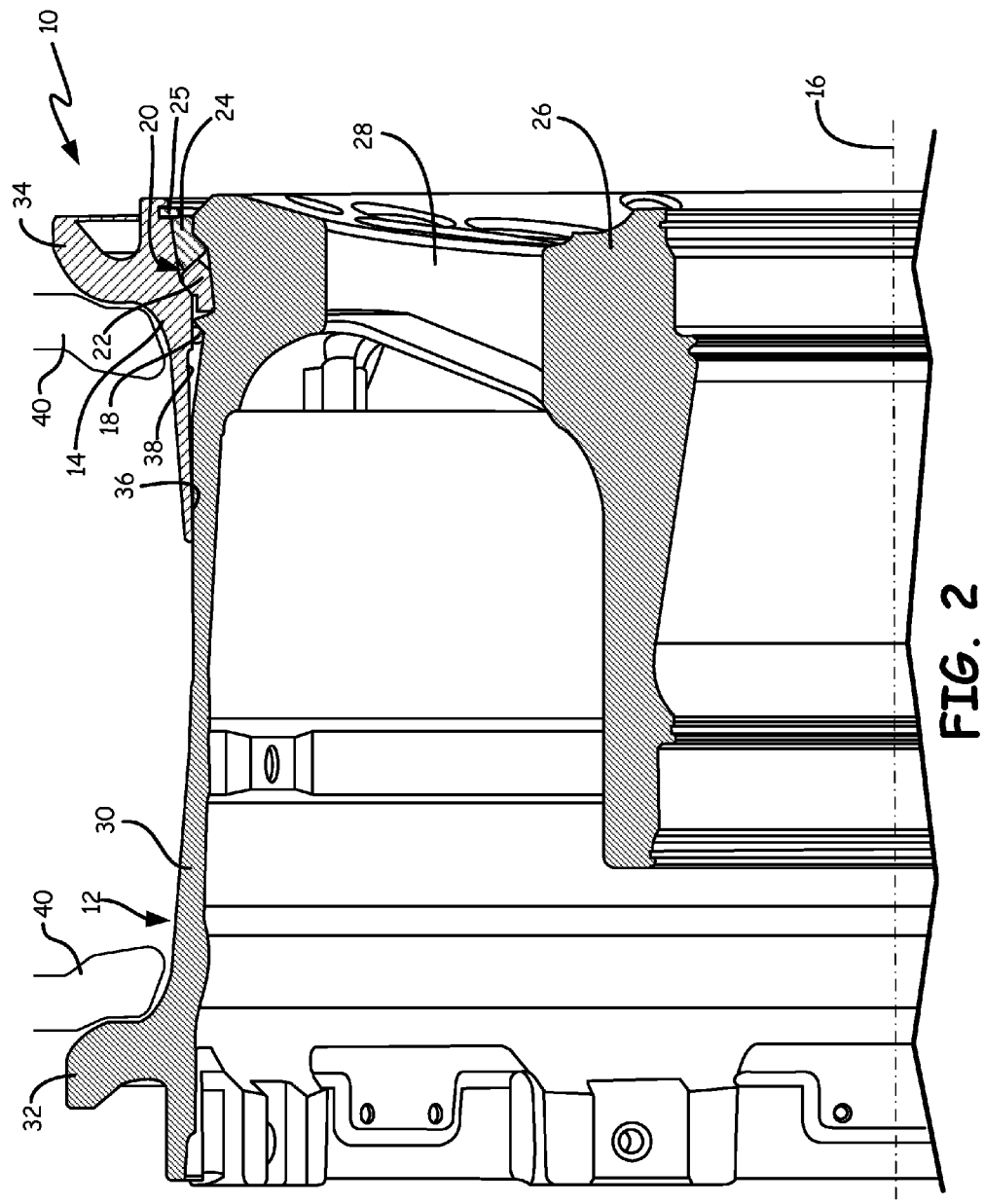
FIG. 2 is a cross-sectional view of the wheel assembly of FIG. 1 taken along line A-A.

FIG. 1 is a perspective view of a wheel assembly 10 according to the present invention, and FIG. 2 is a cross-sectional view of the wheel assembly 10 of FIG. 1 taken along line A-A. Wheel assembly 10 includes wheel base 12, side rim 14, axis 16, air seal 18, cavity 20, first lock ring 22, second lock ring 24, and retaining ring 25. In the embodiment of FIGS. 1 and 2, wheel base 12 includes hub 26, spokes 28, tubewell 30, and inboard flange 32. Side rim 14 includes outboard flange 34, inside surface 36, and recess 38. Wheel assembly 10 also includes tire 40.

Hub 26 is disposed radially inward from tubewell 30 and is the point of contact between an axle of an aircraft or vehicle and wheel assembly 10. Spokes 28 extend radially outward from hub 26 and connect tubewell 30 to hub 26. When wheel assembly 10 is mounted onto an aircraft or any other vehicle, inboard is defined as the direction facing towards the center of the aircraft or vehicle structure and outboard is defined as the direction facing outward or away from the center of the aircraft or vehicle structure. In this embodiment, inboard and outboard refer to specific directions, but in alternate embodiments, they may be reversed. Inboard flange 32 is disposed on tubewell 30 and extends radially outward from tubewell 30 and extends axially inboard. Side rim 14 is disposed around the circumference of tubewell 30 opposite inboard flange 32. Side rim 14 is coaxial with wheel base 12, both being centered about axis 16. Outboard flange 34 extends radially outward from side rim 14 and extends axially outboard. Tire 40 is disposed around tubewell 30 between inboard flange 32 and outboard flange 34. Inside surface 36 of side rim 14 faces tubewell 30 of wheel base 12. Recess 38 is formed on inside surface 36. Cavity 20 is disposed between side rim 14 and tubewell 30 of wheel base 12 and houses first lock ring 22 and second lock ring 24. Retaining ring 25 axially retains first lock ring 22 and second lock ring 24 inside cavity 20. First lock ring 22 is disposed inside cavity 20 axially inboard from second lock ring 24. Air seal 18 is disposed circumferentially around tubewell 30 of wheel base 12 and is disposed between tubewell 30 of wheel base 12 and inside surface 36 of side rim 14. Air seal 18 is disposed axially on inside surface 36 between recess 38 and cavity 20. In the embodiment of FIGS. 1 and 2, air seal 18 is an O-ring.

When first lock ring 22 and second lock ring 24 are correctly assembled inside cavity 20, first lock ring 22 and second lock ring 24 work together as a locking mechanism to prevent side rim 14 from sliding axially outboard off wheel base 12. When first lock ring 22 and second lock ring 24 are correctly assembled inside cavity 20, first lock ring 22 and second lock ring 24 transmit torque from wheel base 12 to side rim 14, such that side rim 14 rotates in unison with wheel base 12. As disclosed below in the description of FIGS. 3 and 12-15, first lock ring 22 and second lock ring 24 form multiple contact points and torque pathways between wheel base 12 and side rim 14, thereby reducing the probability of wheel-skid occurring between wheel base 12 and side rim 14. The discussion in the Background section describes wheel-skid and why it is undesirable. Additionally, when first lock ring 22 and second lock ring 24 are correctly assembled inside cavity 20, air seal 18 engages inside surface 36 of side rim 14 and tubewell 30 of wheel base 12, preventing air from leaking out of wheel assembly 10 between side rim 14 and wheel base 12 as tire 40 is inflated. As described below in the description of FIGS. 3-5, when first lock ring 22 or second lock ring 24 is missing from inside cavity 20, side rim 14 moves axially outboard relative to wheel base 12 such that inside surface 36 disengages air seal 18, thereby allowing air to leak out of wheel assembly 10 between side rim 14 and wheel base 12.

Figure 3:
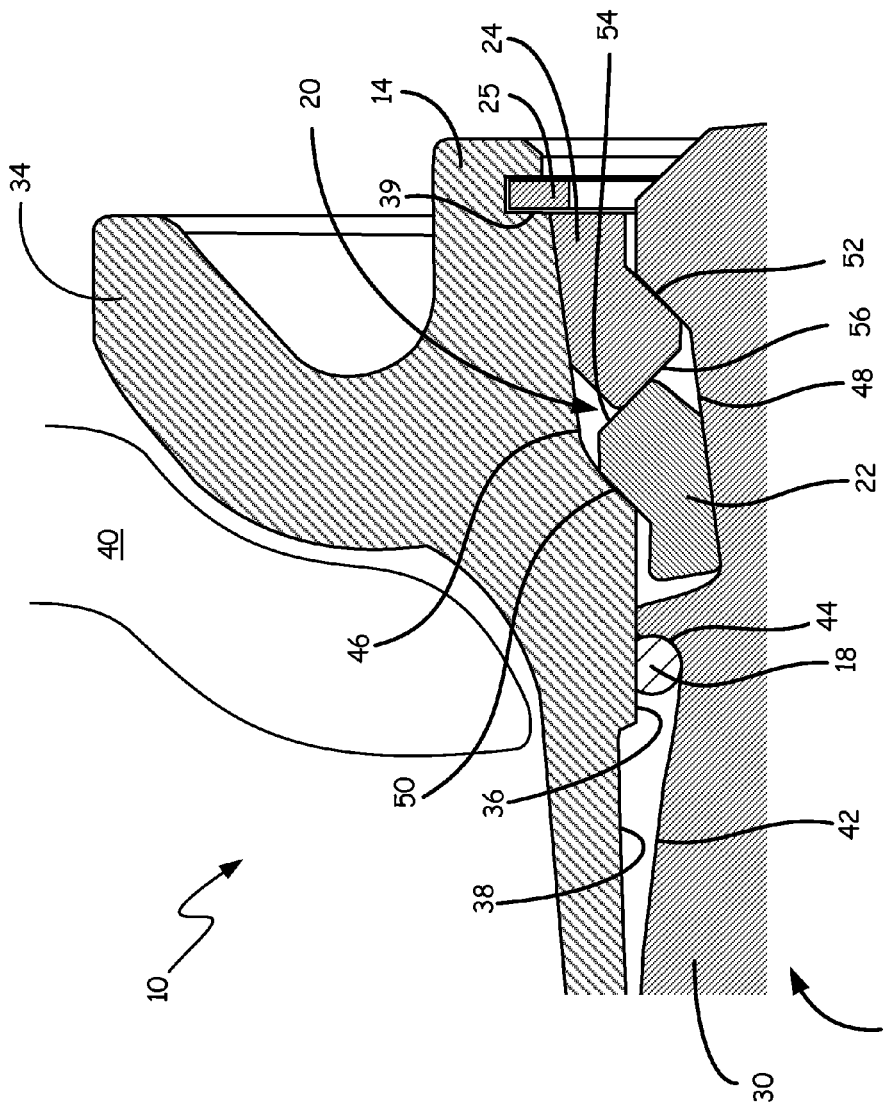
FIG. 3 is an enlarged cross-sectional view of the wheel assembly of FIG. 1 showing a first lock ring and a second lock ring.
Figure 4:
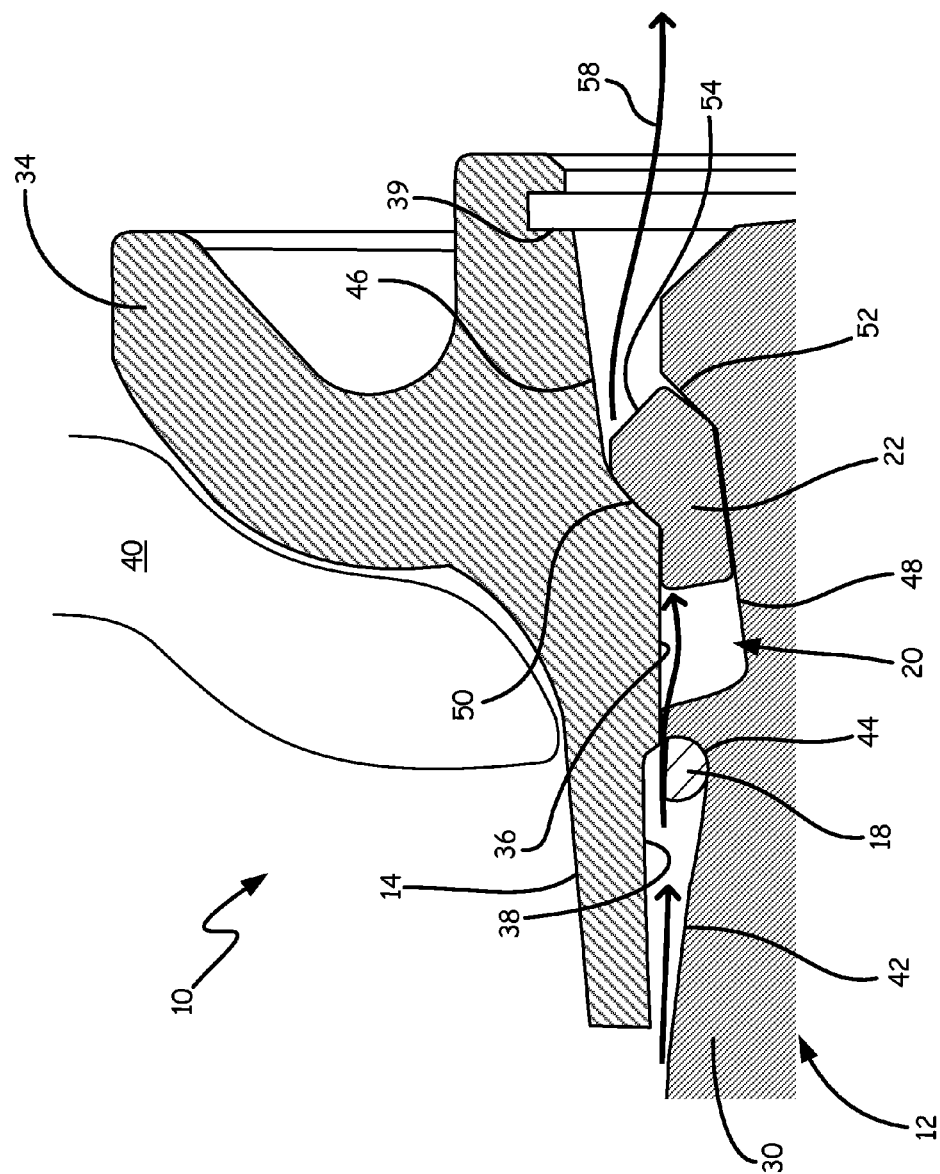
FIG. 4 is an enlarged cross-sectional view of the wheel assembly of FIG. 1 missing the second lock ring.
Figure 5:
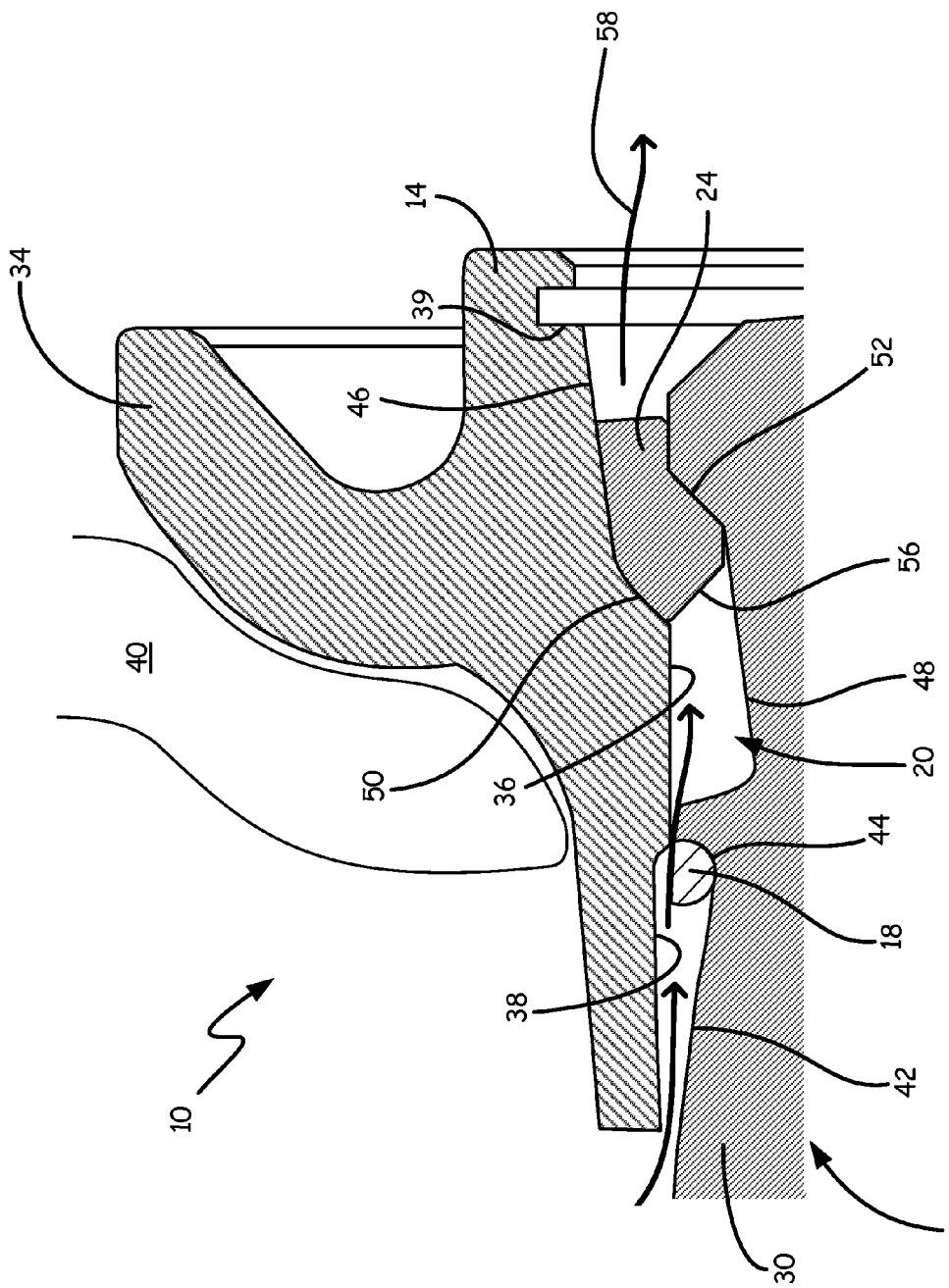
FIG. 5 is an enlarged cross-sectional view of the wheel assembly of FIG. 1 missing the first lock ring.

FIG. 3 is an enlarged cross-sectional view of wheel assembly 10 of FIG. 1, showing first lock ring 22 and second lock ring 24. FIG. 4 is an enlarged cross-sectional view of wheel assembly 10 of FIG. 1 missing second lock ring 24. FIG. 5 is an enlarged cross-sectional view of wheel assembly 10 of FIG. 1 missing first lock ring 22. Wheel assembly 10 includes wheel base 12, side rim 14, air seal 18, cavity 20, first lock ring 22, second lock ring 24, and retaining ring 25. In the embodiment of FIGS. 3-5, wheel base 12 includes tubewell 30, tapered surface 42, and air seal seat 44. Side rim 14 includes outboard flange 34, inside surface 36, recess 38, and retaining ring groove 39. Cavity 20 includes top surface 46, bottom surface 48, first side surface 50, and second side surface 52. First lock ring 22 includes mating surface 54, and second lock ring 24 includes mating surface 56. In the embodiment of FIGS. 3-5, wheel assembly 10 also includes tire 40 and air 58.

In FIGS. 3-5, components of like numbering with the components of FIGS. 1 and 2 are assembled as discussed above with reference to FIGS. 1-2. Tapered surface 42 is formed in tubewell 30 of wheel base 12 and extends radially inward as it extends axially outboard towards cavity 20. Tapered surface 42 stops short of cavity 20 and does not extend into cavity 20. Air seal seat 44 is disposed at an outboard end of tapered surface 42 and is cut to match the shape of air seal 18. Top surface 46 of cavity 20 is formed on inside surface 36 of side rim 14. Bottom surface 48 of cavity 20 is formed on tubewell 30 of wheel base 12. Top surface 46 is parallel to bottom surface 48. First side surface 50 of cavity 20 is formed on inside surface 36 of side rim 14 and extends between inside surface 36 and top surface 46. Second side surface 52 of cavity 20 is formed on tubewell 30 of wheel base 20. Second side surface 52 of cavity 20 extends radially upward and axially outboard from bottom surface 48 of cavity 20. In the embodiment of FIGS. 3-5, first side surface 50 is parallel to second side surface 52.

When first lock ring 22 is correctly installed inside cavity 20, first lock ring 22 contacts bottom surface 48 and first side surface 50 of cavity 20. Because first lock ring 22 is contacting both side rim 14 (at first side surface 50) and wheel base 12 (at bottom surface 48), first lock ring 22 functions as a torque pathway between wheel base 12 and side rim 14. When second lock ring 24 is correctly installed inside cavity 20, second lock ring 24 contacts top surface 46 and second side surface 52 of cavity 20. Because second lock ring 24 is contacting both side rim 14 (at top surface 46) and wheel base 12

(at second side surface 52), second lock ring 24 functions as another torque pathway between wheel base 12 and side rim 14.

Second lock ring 24 is disposed axially outboard from first lock ring 22 inside cavity 20. Mating surface 56 of second lock ring 24 contacts mating surface 54 of first lock ring 22. In the embodiment of FIGS. 3-5, mating surfaces 54 and 56 are oriented perpendicularly relative first side surface 50 and second side surface 52 of cavity 20. By being oriented perpendicularly to first side surface 50 and second side surface 52, mating surfaces 54 and 56 are wedged against each other by side rim 14, side rim 14 being acted upon by the air pressure inside inflated tire 40. By being wedged against each other, mating surfaces 54 and 56 create an additional torque pathway between wheel base 12 and side rim 14, the torque pathway passing through both first lock ring 22 and second lock ring 24.

When first lock ring 22 and second lock ring 24 are correctly assembled inside cavity 20, first lock ring 22 and second lock ring 24 axially limit the outboard travel of side rim 14 with respect to wheel base 12 when the tire 40 is pressurized. As shown in FIG. 3, when first lock ring 22 and second lock ring 24 are correctly assembled inside cavity 20, air seal 18 is positioned axially between recess 38 and first sidewall 50 such that air seal 18 is radially offset with recess 38. When tire 40 is inflated and side rim 14 is correctly positioned, air seal 18 contacts inside surface 36 of side rim 14 between recess 38 and first side wall 50 of cavity 20. When air seal 18 contacts inside surface 36, air 58 inside of tire 40 is unable to escape out of wheel assembly 10 between side rim 14 and wheel base 12. An operator who is assembling wheel assembly 10 can detect proper assembly of lock rings 22 and 24 inside wheel assembly 10 when the operator fills wheel assembly 10 with air 58 and wheel assembly 10 remains pressurized and retaining ring 25 can be installed inside retaining ring groove 39 on side rim 14.

First lock ring 22 and second lock ring 24 may be color coded to visually assist an operator in correctly assembling first lock ring 22 and second lock ring 24 inside cavity 20. As an example, mating surface 54 of first lock ring 22 and mating surface 56 of second lock ring 24 may both be dyed the same color, such as red, while all other surfaces of both first lock ring 22 and second lock ring 24 may be dyed a different color, such as gray. An operator who correctly assembles first lock ring 22 and second lock ring 24 inside cavity 20 should not be able to see any red dye upon visual inspection because mating surface 54 will be mated against mating surface 56. If an operator is able to see red dye after installing first lock ring 22 and second lock ring 24 inside cavity 20, the operator will know that mating surface 54 has not been mated with mating surface 56, and that first lock ring 22 and second lock ring 24 have been incorrectly installed inside cavity 20. This color coding feature can be implemented on any or all of the embodiments disclosed herein.

FIGS. 4 and 5 show wheel assembly 10 in situations where first lock ring 22 and second lock ring 24 have been improperly installed inside cavity 20. In FIG. 4, first lock ring 22 has been installed inside cavity 20, but second lock ring 24 was omitted from cavity 20 during assembly of wheel assembly 10. When tire 40 is pressurized, the pressure inside tire 40 pushes tire 40 against side rim 14, causing side rim 14 to push against first lock ring 22. Because second lock ring 24 was omitted, first lock ring 22 slides inside cavity 20 along bottom surface 48 until first lock ring 22 contacts second side surface 52. As shown in FIG. 4, as first lock ring 22 slides inside cavity 20, side rim 14 also slides outboard and axially until recess 38 formed on inside surface 36 of side rim 14 radially aligns with air seal 18 and causes air seal 18 to at least partially disengage inside surface 36. When air seal 18 disengages inside surface 36, air 58 escapes from wheel assembly 10 between side rim 14 and wheel base 12. As a result of air 58 escaping wheel assembly 10, tire 40 rapidly deflates or is unable to fully inflate at all. An operator who assembles wheel assembly 10 yet fails to include second lock ring 24 inside cavity 20 will be able to detect an assembly error in wheel assembly 10 through the operator's inability to inflate tire 40 without tire 40 going flat.

In FIG. 5, second lock ring 24 has been installed inside cavity 20, but first lock ring 22 was omitted from cavity 20 during assembly of wheel assembly 10. When tire 40 is pressurized, the pressure inside tire 40 pushes tire 40 against side rim 14, causing side rim 14 to slide on tubewell 30 until first side surface 50 contacts second lock ring 24. As shown in FIG. 5, as side rim 14 slides axially outboard on tubewell 30, recess 38 formed on inside surface 36 of side rim 14 becomes radially positioned above air seal 18 such that air seal 18 disengages inside surface 36. When air seal 18 disengages inside surface 36, air 58 escapes from wheel assembly 10 between side rim 14 and wheel base 12. As a result of air 58 escaping wheel assembly 10, tire 40 rapidly loses pressure and is unable to fully inflate. An operator who assembles wheel assembly 10 yet fails to include first lock ring 22 inside cavity 20 will be able to detect an assembly error in wheel assembly 10 through the operator's inability to inflate tire 40 without tire 40 going flat. The operator may also be able to detect an assembly error in wheel assembly 10 through the operator's inability to install retaining ring 25 inside retaining ring groove 39 because first lock ring 22 was improperly installed, causing second lock ring 24 to block retaining ring groove 39.

Figure 6:
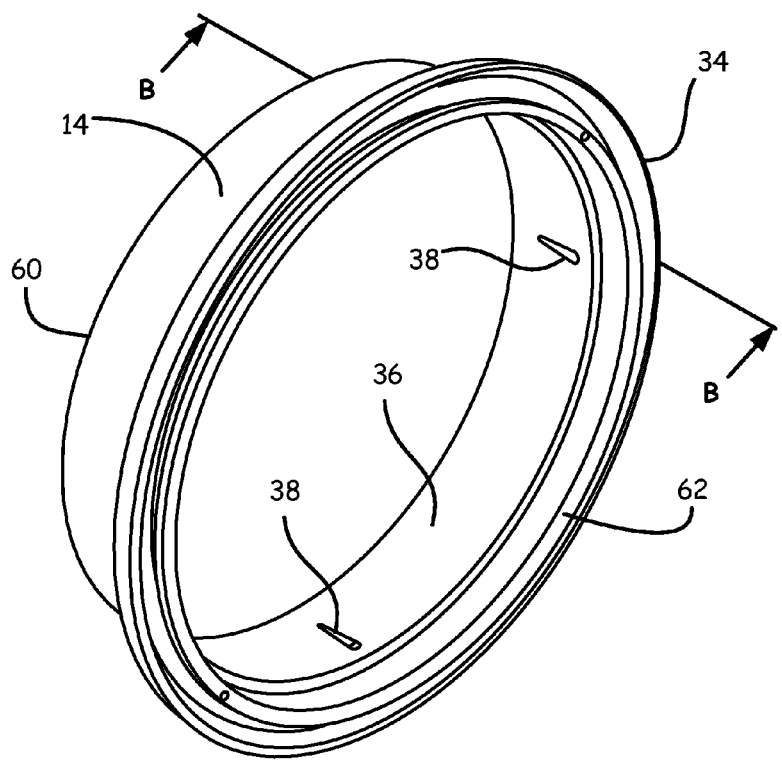
FIG. 6 is a perspective view of a side rim from the wheel assembly of FIG. 1.
Figure 7:
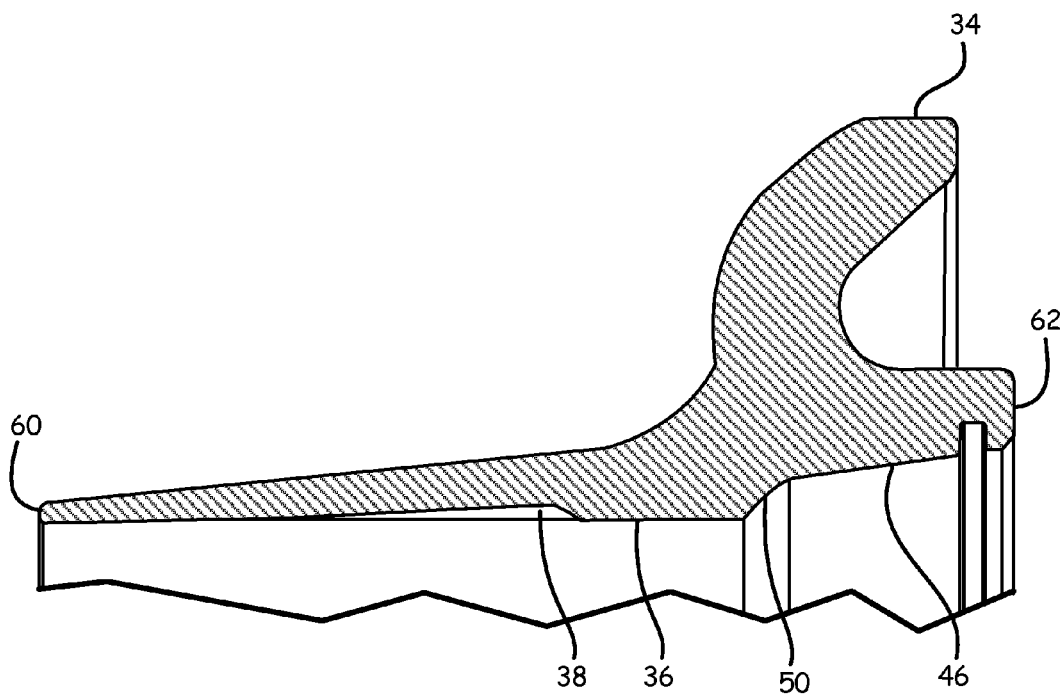
FIG. 7 is an enlarged cross-sectional view of the side rim of FIG. 6 taken along line B-B.

FIGS. 6 and 7 will now be discussed concurrently. FIG. 6 is a perspective view of side rim 14 from the embodiment of wheel assembly 10 in FIG. 1. FIG. 7 is an enlarged cross-sectional view of side rim 14 of FIG. 6 taken along line B-B. Side rim 14 includes outboard flange 34, inside surface 36, recesses 38, inboard end 60, and outboard end 62. In the embodiment of FIGS. 6 and 7, side rim 14 also includes top surface 46 and first side surface 50 for forming cavity 20 as discussed above in the description of FIGS. 3-5.

In FIGS. 6 and 7, components of like numbering with the components of FIGS. 3-5 are assembled as discussed above with reference to FIGS. 3-5. Side rim 14 is generally an annular ring that extends axially from inboard end 60 to outboard end 62. Recesses 38 are formed on inside surface 36 and are spaced circumferentially apart from each other on inside surface 36. Each recess 38 is an axial groove that extends axially on inside surface 36 between inboard end 60 and first side surface 50. Recesses 38 do not contact first side surface 50. Each recess 38 may slope radially outward from inside surface 36 as each recess extends outboard. Recesses 38 may also be curved such that they do not form any sharp angles with inside surface 36. By sloping and curving recesses 38, the formation of stress concentrations may be reduced in side rim 14 as it is used in wheel assembly 10 as described above in FIGS. 1-5. By forming multiple recesses 38 that are circumferentially spaced apart on inside surface 36, and by forming multiple recesses 38 with radii smaller than a minimum bending radius of the air seal 18, air pressure inside wheel assembly 10 cannot lift and push air seal 18, shown in FIGS. 1-5, into recesses 38. Because circumferentially spaced apart recesses 38 and inside surface 36 prevent air seal 18 from entering recesses 38, recesses 38 remain clear and open and air 58, shown in FIGS. 4-5, is able to escape wheel assembly 10 when first lock ring 22 or second lock ring 24, shown in FIGS. 3-5, is left out of cavity 20, or incorrectly installed.

Figure 8:
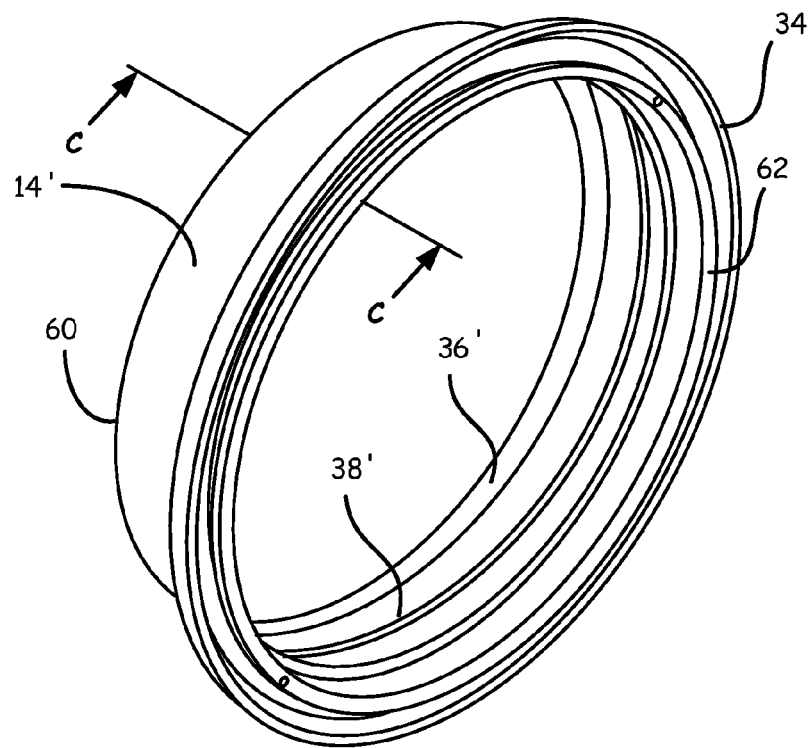
FIG. 8 is a perspective view of another embodiment a side rim according to the present invention.
Figure 9:
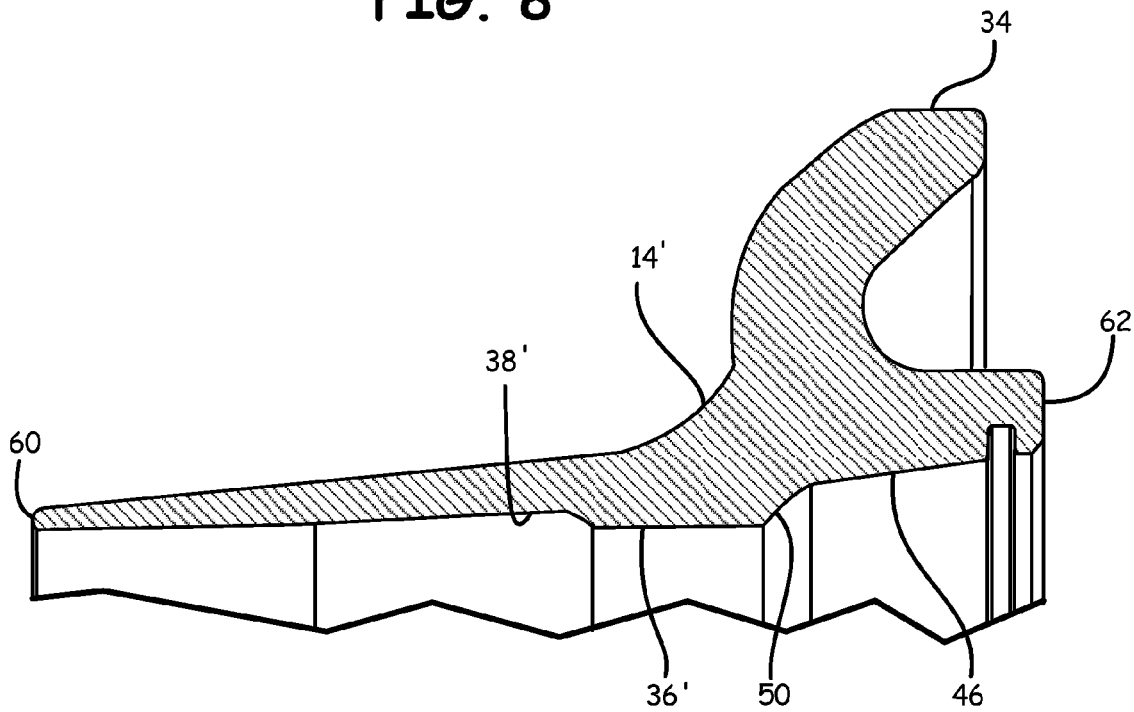
FIG. 9 is an enlarged cross-sectional view of the side rim of FIG. 8 taken along line C-C.

FIGS. 8 and 9 will now be discussed concurrently. FIG. 8 is a perspective view of another embodiment of side rim 14'. FIG. 9 is an enlarged cross-sectional view of side rim 14' of FIG. 8 taken along line C-C. Side rim 14' includes outboard flange 34, inside surface 36', recess 38', inboard end 60, and outboard end 62. In the embodiment of FIGS. 8 and 9, side rim 14' also includes top surface 46 and first side surface 50 for forming cavity 20 as discussed above in the description of FIGS. 3-5.

In FIGS. 8 and 9, components of like numbering with the components of FIGS. 6-7, with the exception of recess 38', are assembled as discussed above with reference to FIGS. 6-7. In the embodiment of FIGS. 8 and 9, recess 38' is an annular groove formed on inside surface 36' that extends axially on inside surface 36' between inboard end 60 and first side surface 50. Recess 38' does not contact first side surface 50. Recess 38' may slope radially outward from inside surface 36' as recess 38' extends outboard. Recess 38' may also include curved edges such that recess 38' does not form any sharp angles with inside surface 36'. By sloping and curving recess 38', the formation of stress concentrations may be reduced in side rim 14' as it is used in wheel assembly 10 as described above in FIGS. 1-5. As described above in FIGS. 3-5, recess 38' allows air 58 to escape wheel assembly 10 past air seal 18 when first lock ring 22 or second lock ring 24 is left out of cavity 20, or incorrectly installed.

Figure 10:
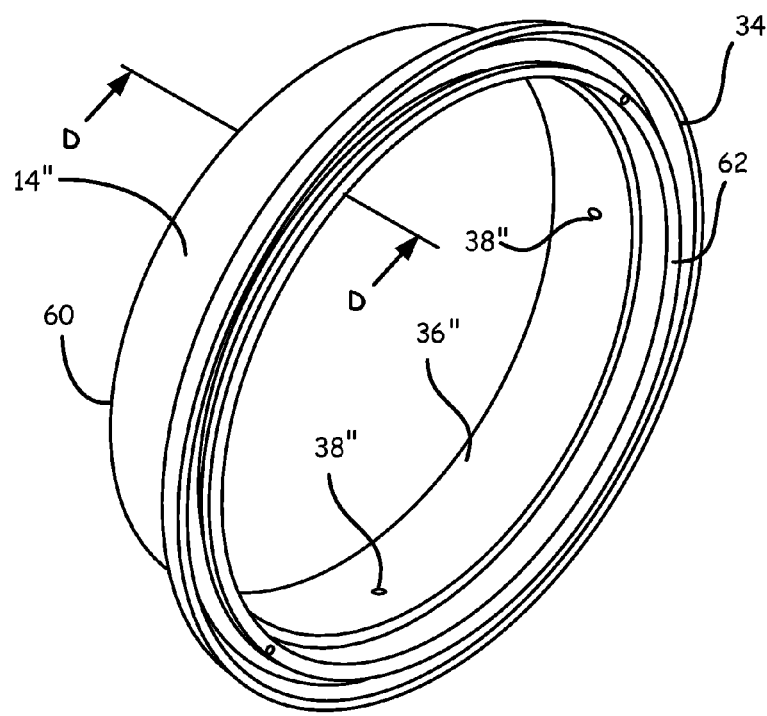
FIG. 10 is a perspective view of another embodiment a side rim according to the present invention.
Figure 11:
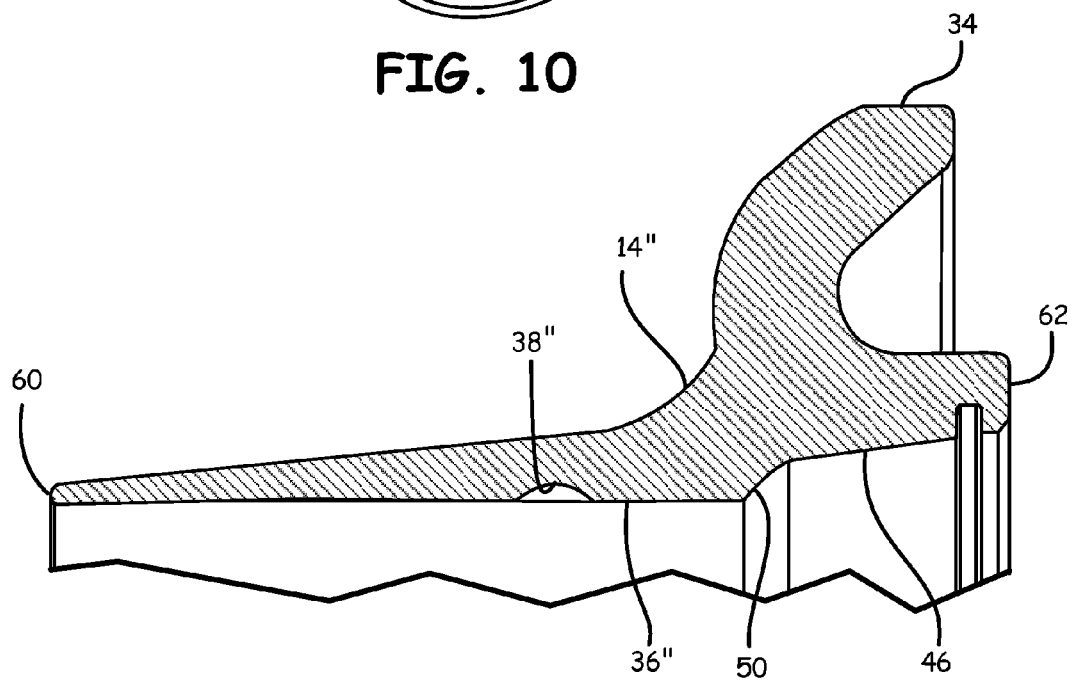
FIG. 11 is an enlarged cross-sectional view of the side rim of FIG. 10 taken along line D-D.

FIGS. 10 and 11 will now be discussed concurrently. FIG. 10 is a perspective view of another embodiment of side rim 14. FIG. 11 is an enlarged cross-sectional view of side rim 14" of FIG. 10 taken along line D-D. Side rim 14" includes outboard flange 34, inside surface 36", recesses 38", inboard end 60, and outboard end 62. In the embodiment of FIGS. 10 and 11, side rim 14" also includes top surface 46 and first side surface 50 for forming cavity 20 as discussed above in the description of FIGS. 3-5.

In FIGS. 10 and 11, components of like numbering with the components of FIGS. 6-7, with the exception of recesses 38", are assembled as discussed above with reference to FIGS. 6-7. Side rim 14" is generally an annular ring that extends axially from inboard end 60 to outboard end 62. Recesses 38" are formed on inside surface 36" and are spaced circumferentially apart from each other on inside surface 36". Recesses 38" do not contact first side surface 50. Each recess 38" is a dimple formed on inside surface 36" between inboard end 60 and first side surface 50. Each recess 38" may be a semispherical dimple. By forming multiple recesses 38" that are circumferentially spaced apart on inside surface 36", and by forming multiple recesses 38" with radii smaller than a minimum bending radius of the air seal 18, air pressure inside wheel assembly 10 cannot lift and push air seal 18, shown in FIGS. 1-5, into recesses 38". Because circumferentially spaced apart recesses 38" and inside surface 36" prevent air seal 18 from entering recesses 38", recesses 38" remain clear and open and air 58, shown in FIGS. 4-5, is able to escape wheel assembly 10 when first lock ring 22 or second lock ring 24, shown in FIGS. 3-5, is left out of cavity 20, or incorrectly installed. A large number of permutations of lock ring cross-section are possible, with a sampling of exemplary embodiments shown in FIGS. 12-15.

Figure 12:
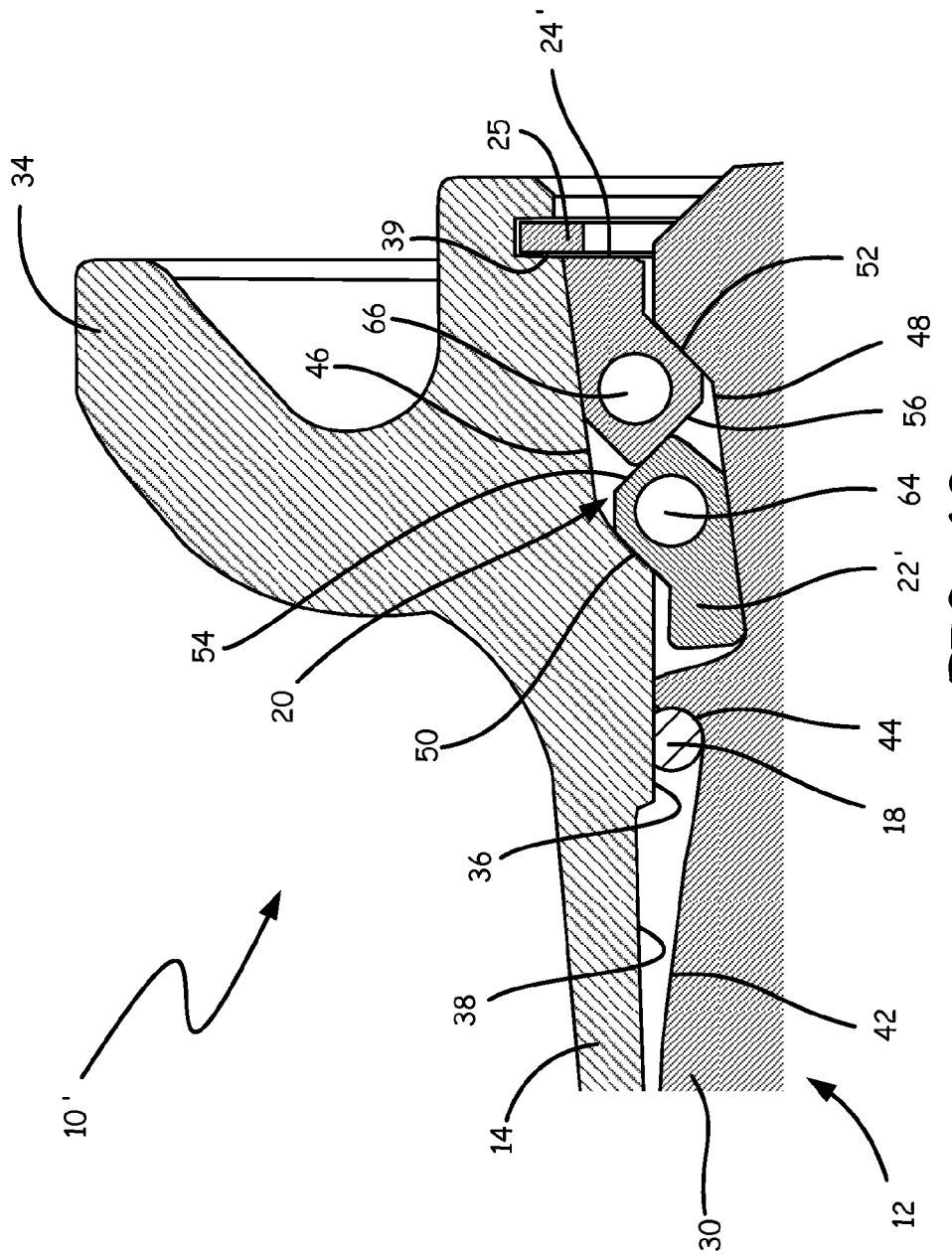
FIG. 12 is an enlarged cross-sectional view of the wheel assembly with another embodiment of the first lock ring and the second lock ring according to the present invention.

FIG. 12 is an enlarged cross-sectional view of wheel assembly 10' with another embodiment of first lock ring 22' and second lock ring 24'. Wheel assembly 10' includes wheel base 12, side rim 14, air seal 18, cavity 20, first lock ring 22', second lock ring 24', and retaining ring 25. In the embodiment of FIG. 12, wheel base 12 includes tubewell 30, tapered surface 42, and air seal seat 44. Side rim 14 includes outboard flange 34, inside surface 36, recess 38, and retaining ring groove 39. Cavity 20 includes top surface 46, bottom surface 48, first side surface 50, and second side surface 52. First lock ring 22' includes mating surface 54 and hollow core 64. Second lock ring 24' includes mating surface 56 and hollow core 66.

In FIG. 12, components of like numbering with the components of FIGS. 3-5 are assembled as discussed above with reference to FIGS. 3-5. Hollow core 64 is formed inside first lock ring 22' and hollow core 66 is formed inside second lock ring 24'. Hollow core 64 reduces the weight of first lock ring 22', and hollow core 66 reduces the weight of second lock ring 24'. Reducing the weight of first lock ring 22' and second lock ring 24' reduces the overall weight of wheel assembly 10' and any vehicle attached to wheel assembly 10', resulting in increased fuel efficiency of the vehicle.

Mating surface 54 of first lock ring 22' and mating surface 56 of second lock ring 24' may also be connected together as a subassembly prior to being inserted inside cavity 20. A connector that could connect mating surface 54 to mating surface 56 may include an adhesive or glue applied between mating surface 54 and mating surface 56. The connector may also include a tie, such as a zip tie, that connects first lock ring 22' to second lock ring 24' such that mating surface 54 abuts mating surface 56. Holes or slots may be formed in first lock ring 22' and second lock ring 22' to accommodate a tie. Connecting first lock ring 22' to second lock ring 24' prior to installing them inside cavity 20 may simplify the assembling process of wheel assembly 10' and ensures that neither first lock ring 22' nor second lock ring 24' is accidentally excluded from wheel assembly 10'.

Figure 13:
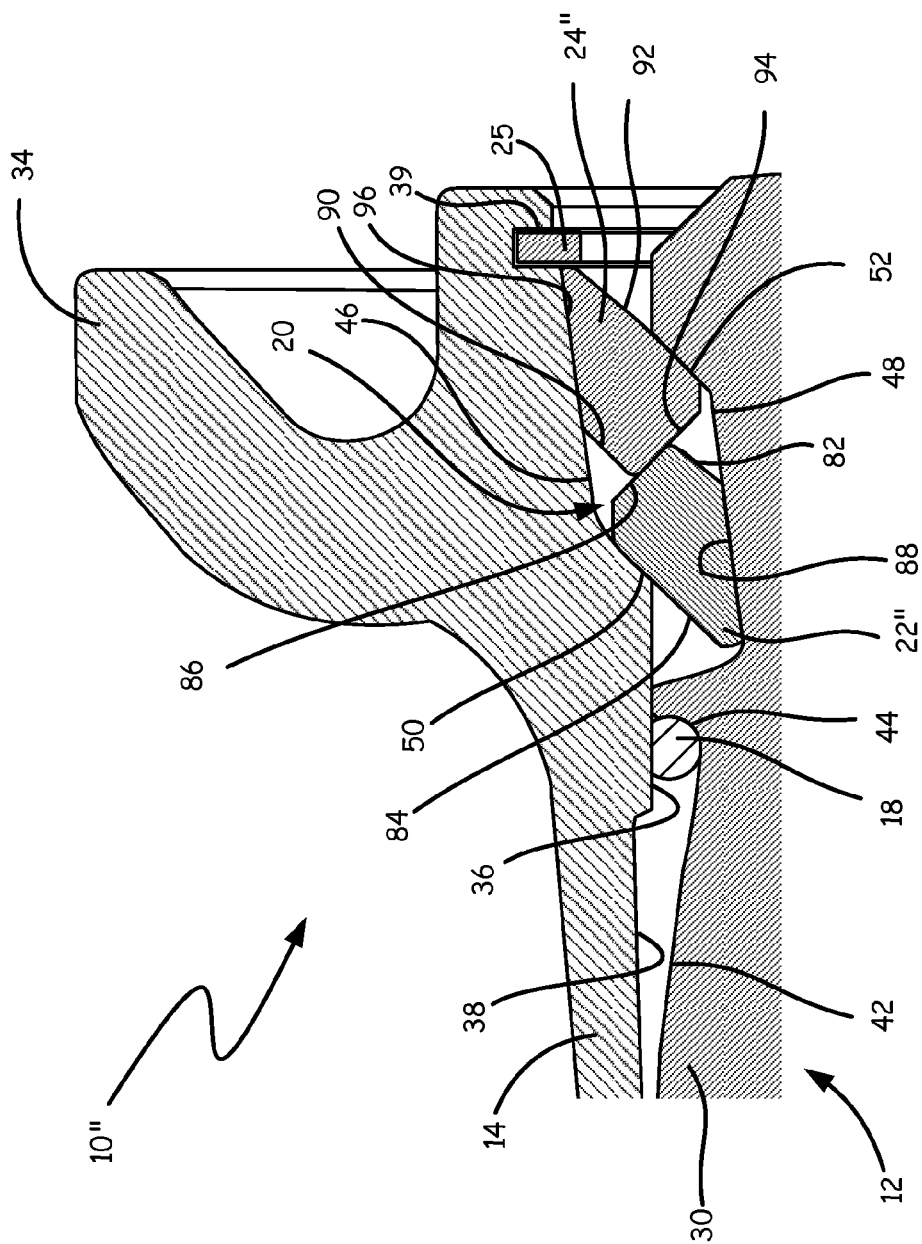
FIG. 13 is an enlarged cross-sectional view of the wheel assembly with another embodiment of the first lock ring and the second lock ring according to the present invention.

FIG. 13 is an enlarged cross-sectional view of wheel assembly 10" with another embodiment of first lock ring 22" and second lock ring 24". Wheel assembly 10" includes wheel base 12, side rim 14, air seal 18, cavity 20, first lock ring 22", second lock ring 24", and retaining ring 25. In the embodiment of FIG. 13, wheel base 12 includes tubewell 30, tapered surface 42, and air seal seat 44. Side rim 14 includes outboard flange 34, inside surface 36, recess 38, and retaining ring groove 39. Cavity 20 includes top surface 46, bottom surface 48, first side surface 50, and second side surface 52. First lock ring 22" includes short side 82, long side 84, perpendicular side 86, and angled side 88. Second lock ring 24" includes short side 90, long side 92, perpendicular side 94, and angled side 96.

In FIG. 13, components of like numbering with the components of FIGS. 3-5 are assembled as discussed above with reference to FIGS. 3-5. Referring to the embodiment of first lock ring 22" in FIG. 13, short side 82 is disposed opposite and parallel to long side 84. Short side 82 is shorter in length than long side 84. Perpendicular side 86 extends perpendicularly between short side 82 and long side 84. Angled side 88 is opposite perpendicular side 86 and extends non-perpendicularly from short side 82 to long side 84. Angled side 88 is longer in length than perpendicular side 86. Together, short side 82, long side 84, perpendicular side 86, and angled side 88 give first lock ring 22" a cross-sectional profile that is generally a trapezoid. First lock ring 22" is disposed inside cavity 20 such that long side 84 contacts first side surface 50 of cavity 20, and angled side 88 contacts bottom surface 48 of cavity 20. Referring now to the configuration of second lock ring 24" in the embodiment of FIG. 13, short side 90 is disposed opposite and parallel to long side 92. Short side 90 is shorter in length than long side 92. Perpendicular side 94 extends perpendicularly between short side 90 and long side 92. Angled side 96 is opposite perpendicular side 94 and extends non-perpendicularly from short side 90 to long side 92. Angled side 96 is longer in length than perpendicular side 94. Together, short side 90 long side 92, perpendicular side 94, and angled side 96 give first lock ring 22" a cross-sectional profile that is generally a trapezoid. Second lock ring 22" is disposed inside cavity 20 such that long side 92 contacts second side surface 52 of cavity 20 and angled side 96 contacts top surface 46 of cavity 20. Perpendicular surface 94 of second lock ring 24" contacts and mates with perpendicular surface 86 of first lock ring 22". The mating function between perpendicular surface 94 of second lock ring 24" and perpendicular surface 86 of first lock ring 22" is similar to that of mating surfaces 54 and 56 shown in FIG. 3 and described above. In the embodiment of FIG. 13, first lock ring 22" and second lock ring 24" both function similarly to the embodiment of first lock ring 22 and second lock ring 24 shown in FIG. 3. However, the embodiment of first lock ring 22" and second lock ring 24" in FIG. 13 are lighter in weight than the embodiment of FIG. 3 and occupy less space inside cavity 20. Reducing the weight of first lock ring 22" and second lock ring 24" reduces the overall weight of wheel assembly 10" and increases the fuel efficiency of any vehicle that utilizes wheel assembly 10".

Figure 14:
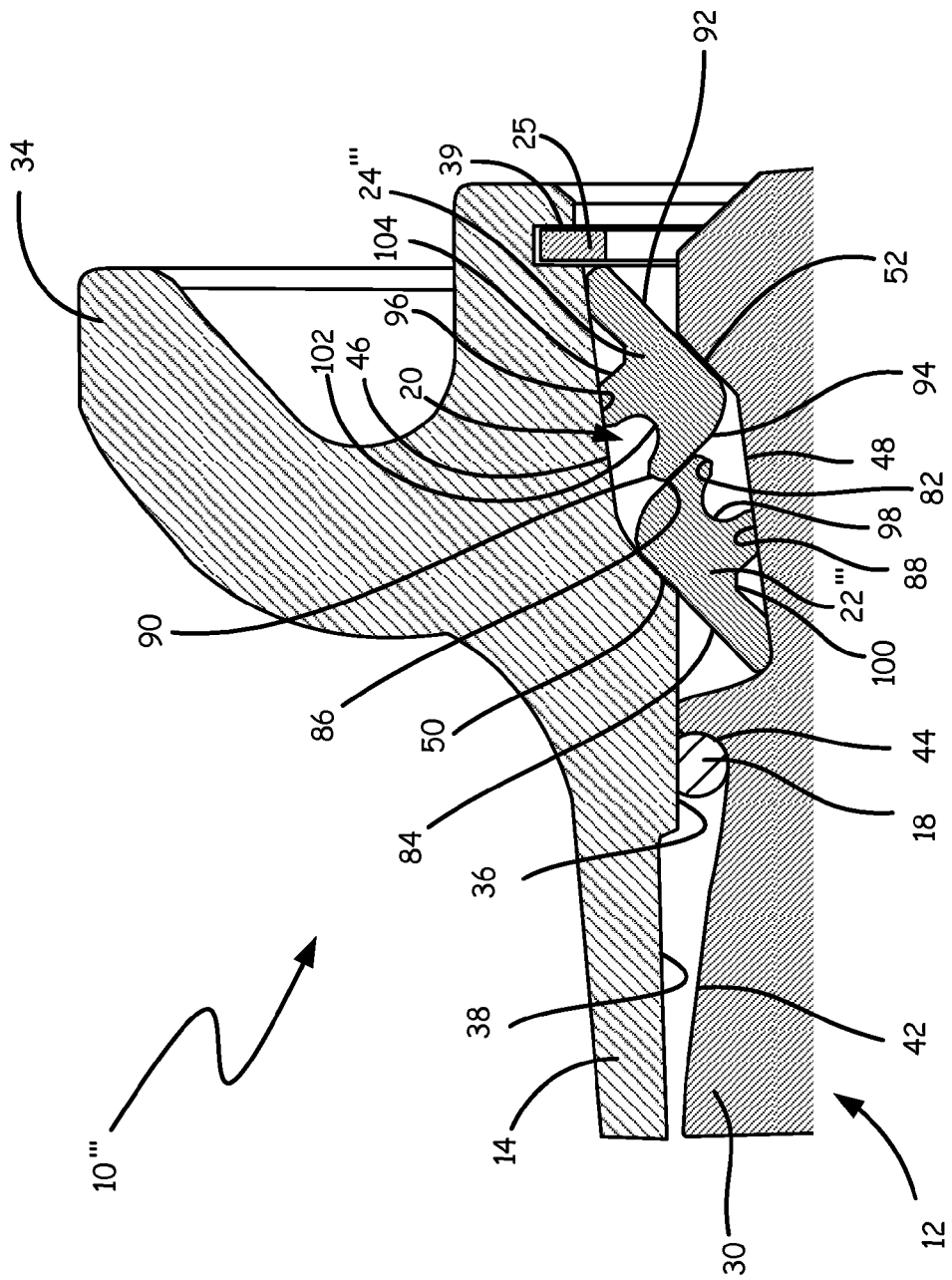
FIG. 14 is an enlarged cross-sectional view of the wheel assembly with another embodiment of the first lock ring and the second lock ring according to the present invention.

FIG. 14 is an enlarged cross-sectional view of wheel assembly 10''' with another embodiment of first lock ring 22''' and second lock ring 24''' according to the present invention. Wheel assembly 10' includes wheel base 12, side rim 14, air seal 18, cavity 20, first lock ring 22''', second lock ring 24''', and retaining ring 25. In the embodiment of FIG. 14, wheel base 12 includes tubewell 30, tapered surface 42, and air seal seat 44. Side rim 14 includes outboard flange 34, inside surface 36, recess 38, and retaining groove 39. Cavity 20 includes top surface 46, bottom surface 48, first side surface 50, and second side surface 52. First lock ring 22''' includes short side 82, long side 84, perpendicular side 86, angled side 88, first annular channel 98, and second annular channel 100. Second lock ring 24''' includes short side 90, long side 92, perpendicular side 94, angled side 96, first annular channel 102, and second annular channel 104.

In FIG. 14, components of like numbering with the components of FIG. 13 are assembled as discussed above with reference to FIG. 13. Referring to the embodiment of first lock ring 22''' in FIG. 14, first annular channel 98 is formed on short side 82 of first lock ring 22'''. Second annular channel 100 is formed on angled side 88 of first lock ring 22'''. First annular channel 98 and second annular channel 100 reduce the weight of first lock ring 22''' and increase the flexibility of first lock ring 22'''. In the embodiment of second lock ring 24''', shown in FIG. 14, first annular channel 102 is formed on short side 90 of second lock ring 24'''. Second annular channel 104 is formed on angled side 96 of second lock ring 24'''. First annular channel 102 and second annular channel 104 reduce the weight of second lock ring 24''' and increase the flexibility of second lock ring 24'''.

Reducing the weight of first lock ring 22''' and second lock ring 24''' reduces the overall weight of wheel assembly 10''' and increases the fuel efficiency of any vehicle that utilizes wheel assembly 10'''. Increasing the flexibility of first lock ring 22''' and second lock ring 24''' also helps to ensure that first lock ring 22''' and second lock ring 24''' have multiple contact points with wheel base 12 and side rim 14.

Figure 15:
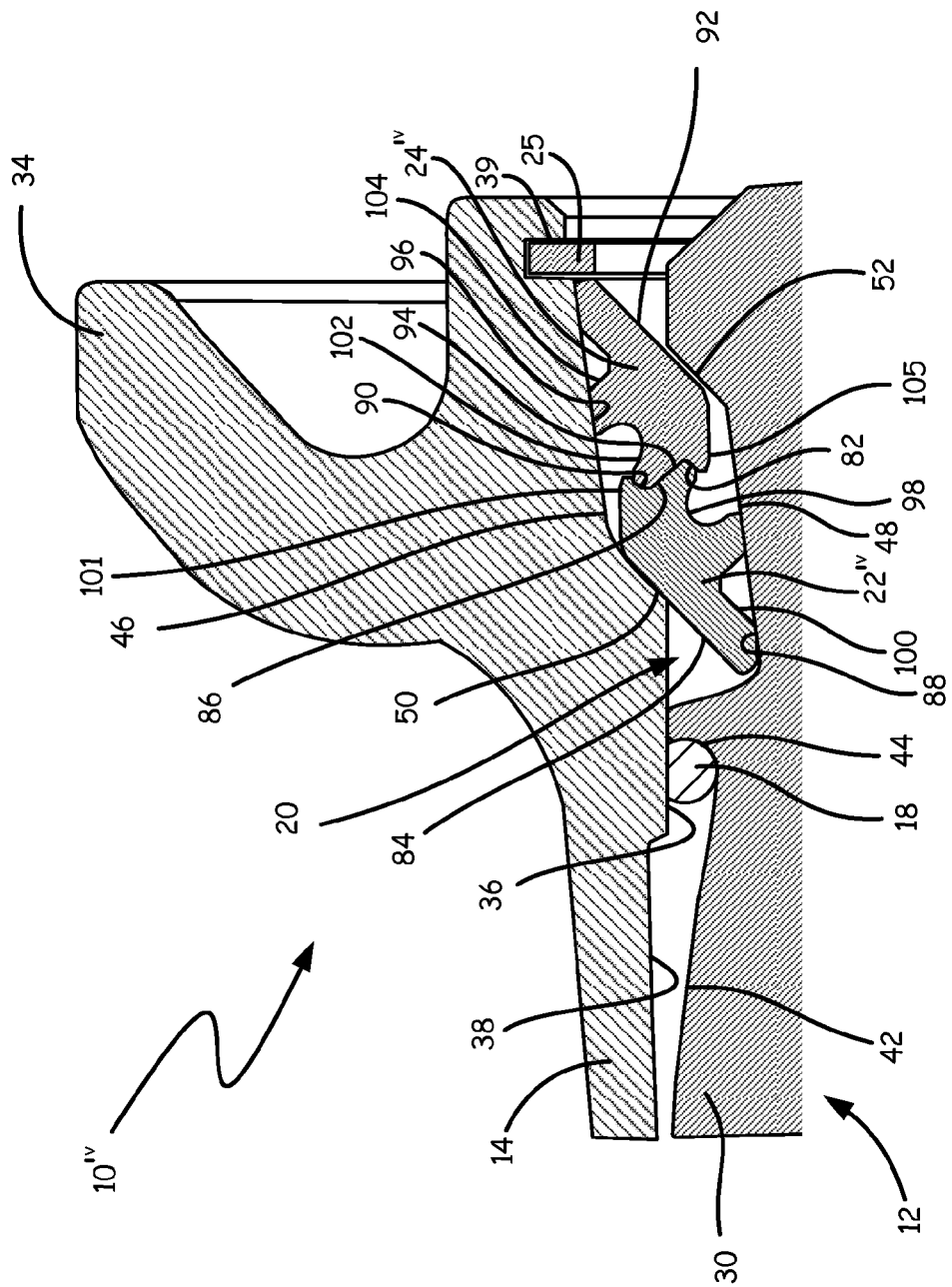
FIG. 15 is an enlarged cross-sectional view of the wheel assembly with another embodiment of the first lock ring and the second lock ring according to the present invention.

FIG. 15 is an enlarged cross-sectional view of wheel assembly $10^{IV}$ with another embodiment of first lock ring $22^{IV}$ and second lock ring $24^{IV}$ according to the present invention. Wheel assembly $10^{IV}$ includes wheel base 12, side rim 14, air seal 18, cavity 20, first lock ring $22^{IV}$, second lock ring $24^{IV}$, and retaining ring 25. In the embodiment of FIG. 15, wheel base 12 includes tubewell 30, tapered surface 42, and air seal seat 44. Side rim 14 includes outboard flange 34, inside surface 36, recess 38, and retaining ring groove 39. Cavity 20 includes top surface 46, bottom surface 48, first side surface 50, and second side surface 52. First lock ring $22^{IV}$ includes short side 82, long side 84, perpendicular side 86, angled side 88, first annular channel 98, second annular channel 100, and prong 101. Second lock ring $24^{IV}$ includes short side 90, long side 92, perpendicular side 94, angled side 96, first annular channel 102, second annular channel 104, and prong 105.

In FIG. 15, components of like numbering with the components of FIG. 14 are assembled as discussed above with reference to FIG. 14. Prong 101 is formed on perpendicular side 86 of first lock ring $22^{IV}$. Prong 101 extends axially outboard and radially outward from perpendicular side 86 of first lock ring $22^{IV}$. Prong 105 is formed on perpendicular side 94 of second lock ring $24^{IV}$. Prong 105 extends axially inboard as it extends radially inward from perpendicular side 94 of second lock ring $24^{IV}$. Inside cavity 20, perpendicular side 86 and short side 82 of first lock ring $22^{IV}$ mate and interlock with prong 105 and perpendicular side 94 of second lock ring $24^{IV}$. Perpendicular side 94 and short side 90 of second lock ring $24^{IV}$ mates and interlocks with prong 101 and perpendicular side 86 of first lock ring $22^{IV}$. Prong 101 and prong 105 prevent perpendicular surface 86 of first lock ring $22^{IV}$ and perpendicular surface 94 of second lock ring $24^{IV}$ from slipping against each other. By preventing perpendicular surfaces 86 and 94 from slipping against each other, prong 101 of first lock ring $22^{IV}$ and prong 105 of second lock ring $24^{IV}$ ensure that at least one contact point is maintained between first lock ring $22^{IV}$ and second lock ring $24^{IV}$. Maintaining contact points between first lock ring $22^{IV}$ and second lock ring $24^{IV}$ allows toque to be transferred from wheel base 12 across both first lock ring $22^{IV}$ and second lock ring $24^{IV}$ to side rim 14.

Figure 16:
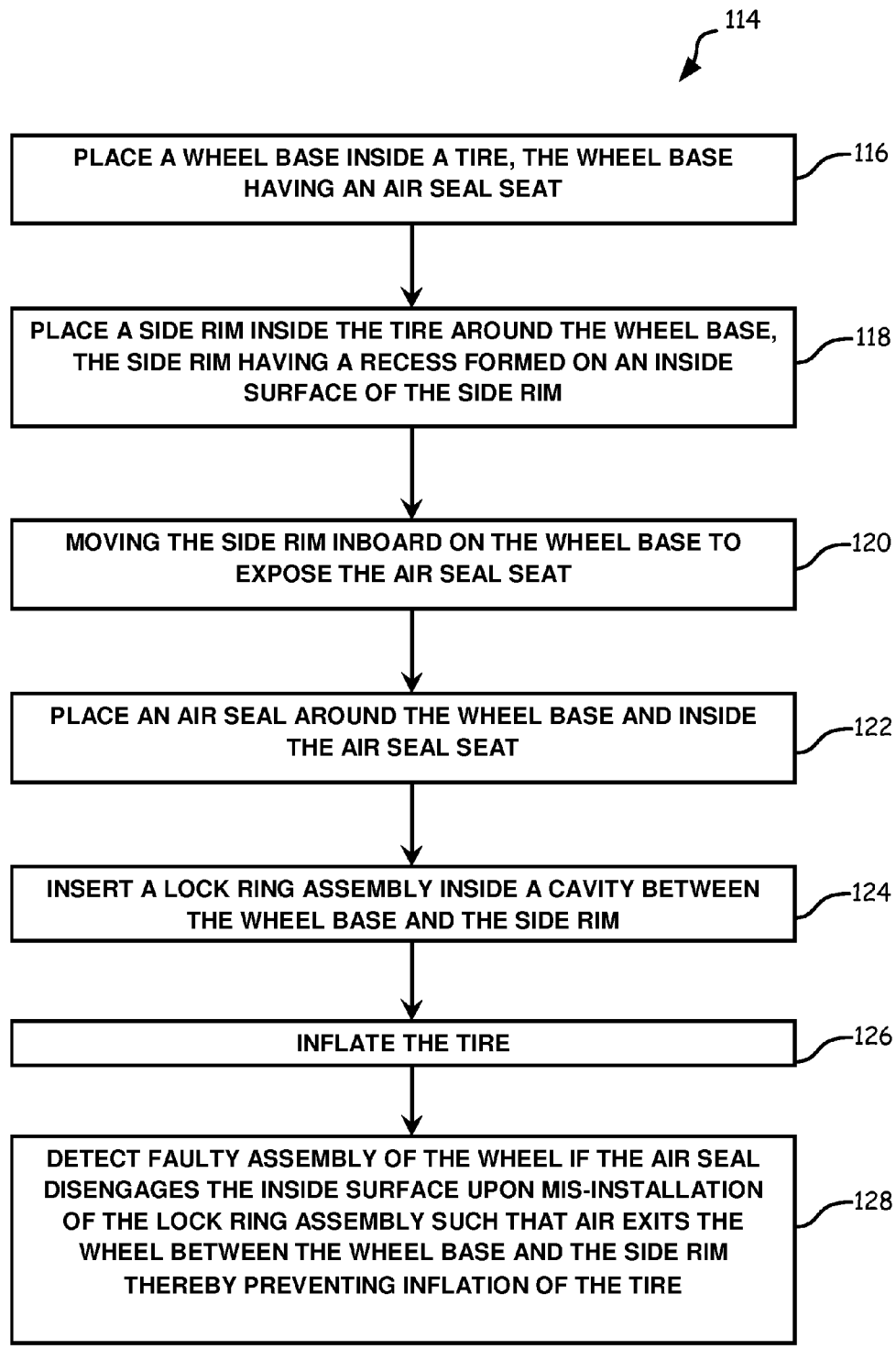
FIG. 16 discloses a diagram of a method for assembling a wheel.

FIG. 16 discloses a diagram of method 114, which begins with placing a wheel base inside a tire (step 116). The wheel base includes an air seal seat. A side rim is placed inside the tire around the wheel base (step 118). The side rim includes a recess formed on an inside surface of the side rim. The side rim is moved inboard on the wheel base to expose the air seal seat (step 120). An air seal is placed around the wheel base and inside the air seal seat (step 122). A lock ring assembly is inserted inside a cavity between the wheel base and the side rim (step 124). The tire is inflated (step 126). Faulty assembly of the wheel is detected if the air seal disengages, or fails to engage, the inside surface upon mis-installation of the lock ring assembly such that air exits the wheel between the wheel base and the side rim thereby preventing inflation of the tire (step 128).

In view of the foregoing description, it will be recognized that the present disclosure provides numerous advantages and benefits. For example, the present disclosure provides wheel assembly with first lock ring 22 and second lock ring 24 between wheel base 12 and side rim 14. First lock ring 22 and second lock ring 24 provide more torque pathways between wheel base 12 and side rim 14 than wheel assemblies in the prior art that only include a single lock ring. Because first lock ring 22 and second lock ring 24 provide more toque pathways between wheel base 12 and side rim 14, the probability of wheel-skid is reduced. Furthermore, side rim 14 includes recess 38 which allows air 58 to escape wheel assembly 10 when first lock ring 22 or second lock ring 24 is not properly installed between wheel base 12 and side rim 14. Because wheel assembly 10 is unable to remain pressurized when first lock ring 22 or second lock ring 24 is incorrectly installed, the probability that wheel assembly 10 will be incorrectly assembled and subsequently used is reduced. By reducing the use of incorrectly assembled wheel assemblies 10, consumer safety is enhanced.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A wheel assembly comprising:
 a wheel base;
 a side rim disposed about a circumference of the wheel base and including an inside surface and a recess formed on the inside surface;
 an air seal disposed between the wheel base and the inside surface of the side rim, wherein the air seal engages the inside surface of the side rim; and
 a locking mechanism that secures the side rim onto the wheel base, the locking mechanism preventing the side rim from sliding axially off the wheel base, wherein the locking mechanism is configured to prevent the air seal from disengaging the inside surface and allowing air to exit the wheel assembly between the wheel base and the side rim when the locking mechanism is properly installed, and wherein the locking mechanism is configured to permit the side rim to move axially such that the recess formed on the inside surface of the side rim radially aligns with the air seal to allow air to exit the wheel assembly between the wheel base and the side rim when the locking mechanism is not properly installed,
 wherein the locking mechanism comprises a first lock ring and a second lock ring disposed inside a cavity between the wheel base and the side rim, wherein the air seal contacts the inside surface of the side rim while being radially offset with the recess when both the first lock ring and the second lock ring are properly disposed inside the cavity, and wherein the air seal is radially aligned with the recess when only one of the first lock ring and the second lock ring is disposed inside the cavity.

2. The wheel assembly of claim 1, wherein the recess formed on the inside surface of the side rim is an annular groove.

3. The wheel assembly of claim 1, wherein the recess formed on the inside surface of the side rim is an axial groove.

4. The wheel assembly of claim 3, wherein multiple axial grooves are formed on the inside surface of the side rim, the axial grooves being spaced circumferentially apart from each other on the inside surface of the side rim.

5. The wheel assembly of claim 1, wherein the recess formed on the inside surface of the side rim is a dimple.

6. The wheel assembly of claim 5, wherein multiple dimples are formed on the inside surface of the side rim, the dimples being spaced circumferentially apart from each other on the inside surface of the side rim.

7. The wheel assembly of claim 1, wherein the first lock ring and the second lock ring each have a cross-sectional profile that is generally a trapezoid with a short side opposite and parallel to a long side, a perpendicular side between the short side and the long side, and an angled side opposite the perpendicular side.

8. The wheel assembly of claim 7, wherein the first lock ring and the second lock ring are disposed inside the cavity such that the angled side of the first lock ring contacts the wheel base, the long side of the first lock ring contacts the inside surface of the side rim, and the perpendicular side of the first lock ring contacts the perpendicular side of the second lock ring.

9. The wheel assembly of claim 8, wherein the angled side of the second lock ring contacts the inside surface of the side rim, and the long side of the second lock ring contacts the wheel base inside of the cavity.

10. The wheel assembly of claim 1, wherein the first lock ring comprises a mating surface that mates with a mating surface of the second lock ring.

11. The wheel assembly of claim 10, wherein the mating surface of the first lock ring and the mating surface of the second lock ring are color coded.

12. The wheel assembly of claim 10, wherein a connector connects the mating surface of the first lock ring to the mating surface of the second lock ring.

13. The wheel assembly of claim 1, wherein the cavity includes a bottom surface formed on the wheel base and a top surface formed on the inside surface of the side rim, the top surface being parallel to the bottom surface.

14. The wheel assembly of claim 13, wherein the cavity includes a first side surface formed on the inside surface of the side rim and a second side surface formed on the wheel base, the first side surface being parallel to the second side surface.

15. The wheel assembly of claim 14, wherein the bottom surface and first side surface of the cavity contact the first lock ring and the top surface and second side surface of the cavity contact the second lock ring.

16. A method for assembling a wheel, the method comprising:
 placing a wheel base inside a tire, the wheel base having an air seal seat;
 placing a side rim inside the tire around the wheel base, the side rim having a recess formed on an inside surface of the side rim;
 moving the side rim on the wheel base to expose the air seal seat;
 placing an air seal around the wheel base and inside the air seal seat, wherein the air seal is configured to contact an inside surface of the side rim;
 inserting a lock ring assembly inside a cavity between the wheel base and the side rim, wherein the locking mechanism comprises a first lock ring and a second lock ring;
 inflating the tire; and
 detecting faulty assembly of the wheel if the side rim axially translates such that the recess formed on the inside surface of the side rim radially aligns with the air seal when only one of the first lock ring and the second lock ring is installed inside the cavity, such that air exits the wheel between the wheel base and the side rim thereby preventing inflation of the tire.

17. The wheel assembly of claim 16, wherein the first lock ring interlocks with the second lock ring.

18. A wheel assembly comprising:
 a wheel base;
 a side rim disposed about a circumference of the wheel base and including an inside surface and a recess formed on the inside surface;
 a cavity disposed between the wheel base and the side rim;

an air seal disposed between the wheel base and the inside surface of the side rim, and disposed axially between the recess and the cavity, wherein the air seal contacts the inside surface of the side rim; and a multipart lock ring assembly disposed within the cavity and configured, when properly installed, to prevent the air seal from radially aligning with the recess formed on the inside surface of the side rim and allowing air to exit the wheel assembly between the wheel base and the side rim, and wherein the multipart lock ring assembly is configured to permit the recess formed on the inside surface of the side rim to radially align with the air seal and allow air to exit the wheel assembly between the wheel base and the side rim when only a portion of the multipart lock ring assembly is installed in the cavity.

19. The method of claim 18, wherein the lock ring assembly comprises a first lock ring and a second lock ring.

20. The wheel assembly of claim 19, wherein the first lock ring and the second lock ring each include at least one annular channel.

21. The wheel assembly of claim 19, wherein the first lock ring and the second lock ring are hollow.

\* \* \* \* \*